(12) United States Patent
Wang et al.

(10) Patent No.: US 8,221,248 B2
(45) Date of Patent: Jul. 17, 2012

(54) OVERLOAD PROTECTION MECHANISM AND SHAFT COUPLING DEVICE USING THE SAME

(75) Inventors: Jin-Xin Wang, Shenzhen (CN); Han-Zheng Zhang, Shenzhen (CN); Xiao-Bo Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 316 days.

(21) Appl. No.: 12/537,422

(22) Filed: Aug. 7, 2009

(65) Prior Publication Data
US 2010/0307885 A1 Dec. 9, 2010

(30) Foreign Application Priority Data
Jun. 3, 2009 (CN) .......................... 2009 1 0302871

(51) Int. Cl.
*F16D 1/112* (2006.01)

(52) U.S. Cl. ........................ 464/37; 464/901; 464/162

(58) Field of Classification Search .................. 464/30, 464/37–39, 162, 901; 403/109.3, 166, 327, 403/328, DIG. 3, DIG. 4; 192/56.1, 56.5, 192/56.51, 56.56
See application file for complete search history.

(56) References Cited

U.S. PATENT DOCUMENTS

| | | | | |
|---|---|---|---|---|
| 2,135,929 A * | 11/1938 | Wood | ............................... | 464/37 |
| 3,487,902 A * | 1/1970 | Nissmo et al. | ............... | 192/56.1 |
| 3,526,040 A * | 9/1970 | Young | ....................... | 403/327 X |
| 5,083,331 A * | 1/1992 | Schnelle et al. | .......... | 403/327 X |
| 5,335,949 A * | 8/1994 | Maury et al. | ............. | 403/328 X |
| 5,593,196 A * | 1/1997 | Baum et al. | ............ | 403/109.3 X |
| 5,651,150 A * | 7/1997 | Kanitzer et al. | .......... | 403/327 X |
| 5,924,536 A * | 7/1999 | Frenken | ....................... | 192/56.1 |
| 6,220,778 B1 * | 4/2001 | Suchanek et al. | ............. | 403/327 |
| 6,309,303 B1 * | 10/2001 | Vodicka | .......................... | 464/30 |
| 6,595,713 B1 * | 7/2003 | Wilson | ...................... | 403/328 X |
| 6,688,800 B2 * | 2/2004 | Kresge | ...................... | 403/327 X |
| 7,700,902 B2 * | 4/2010 | Mock et al. | ..................... | 192/56.1 X |
| 2004/0234332 A1 * | 11/2004 | Burgstaler et al. | ............ | 403/327 |
| 2009/0092442 A1 * | 4/2009 | Shim et al. | ..................... | 403/327 |
| 2009/0190995 A1 * | 7/2009 | Xu et al. | ..................... | 403/109.3 |
| 2009/0233720 A1 * | 9/2009 | Shim et al. | ........................ | 464/38 |
| 2011/0081976 A1 * | 4/2011 | Lee et al. | ......................... | 464/37 |

* cited by examiner

*Primary Examiner* — Gregory Binda
*Assistant Examiner* — Matthieu Setliff
(74) *Attorney, Agent, or Firm* — Altis Law Group, Inc.

(57) ABSTRACT

An overload protection mechanism includes a frame and a positioning assembly received in the frame. The frame includes at least one side plate, the at least one side plate defining a receiving depression. The positioning assembly includes a fixing sleeve, at least one elastic member received in the fixing sleeve, and at least one latching member positioned on the at least one elastic member and movably received in the receiving depression. The at least one side plate further defines a slanted repositioning surface adjoining the receiving depression. The positioning assembly is slidable relative to the frame with the at least one elastic member resisting the at least one latching member to press the at least one latching member along the slanted repositioning surface until the at least one latching member is received in the receiving depression.

13 Claims, 5 Drawing Sheets

OVERLOAD PROTECTION MECHANISM AND SHAFT COUPLING DEVICE USING THE SAME

BACKGROUND

1. Technical Field

The present disclosure relates to overload protection mechanisms and, particularly, to an overload protection mechanism used in a shaft coupling device.

2. Description of the Related Art

Industrial robots are widely used in various applications to greatly reduce the burden of factory workers. A manipulator is an important component of the industrial robot. A typical manipulator includes a mechanical arm, a typical shaft coupling device, and a mechanical hand. The typical shaft coupling device interconnects the mechanical arm with the mechanical hand. The typical shaft coupling device includes an overload protection mechanism to protect the manipulator when the mechanical hand is applied to an external, overloaded force. The overload protection mechanism includes a sleeve, a fixing member rotatable sleeved on the sleeve, a plurality of springs, and a plurality of balls. The sleeve is fixed to the mechanical hand, and the fixing member is fixed to the mechanical arm. The fixing member defines a plurality of fixing holes in a side surface thereof, and the sleeve defines a plurality of receiving grooves in a side surface thereof corresponding to the fixing holes. One end of each of the springs is fixedly received in a receiving groove of the receiving grooves, and each of the balls is fixed to the distal end of each of the springs. The diameter of the balls is larger than that of the fixing holes, and is smaller than that of the receiving grooves. The compressed springs press the balls against the fixing holes, thereby the balls are received both in the receiving holes and at least partly in the fixing holes, to achieve non-slip rotation by the mechanical hand. When the mechanical arm is overloaded, the fixing member may move relative to the sleeve, and the fixing holes slide away, so the balls are entirely received in the receiving grooves. Thereby the mechanical arm ceases to drive the mechanical hand in rotation, which provides a protection against overload of the typical shaft coupling device. However, the typical overload protection mechanism used in the manipulator is difficult to automatically return after the overload protection mechanism is released.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
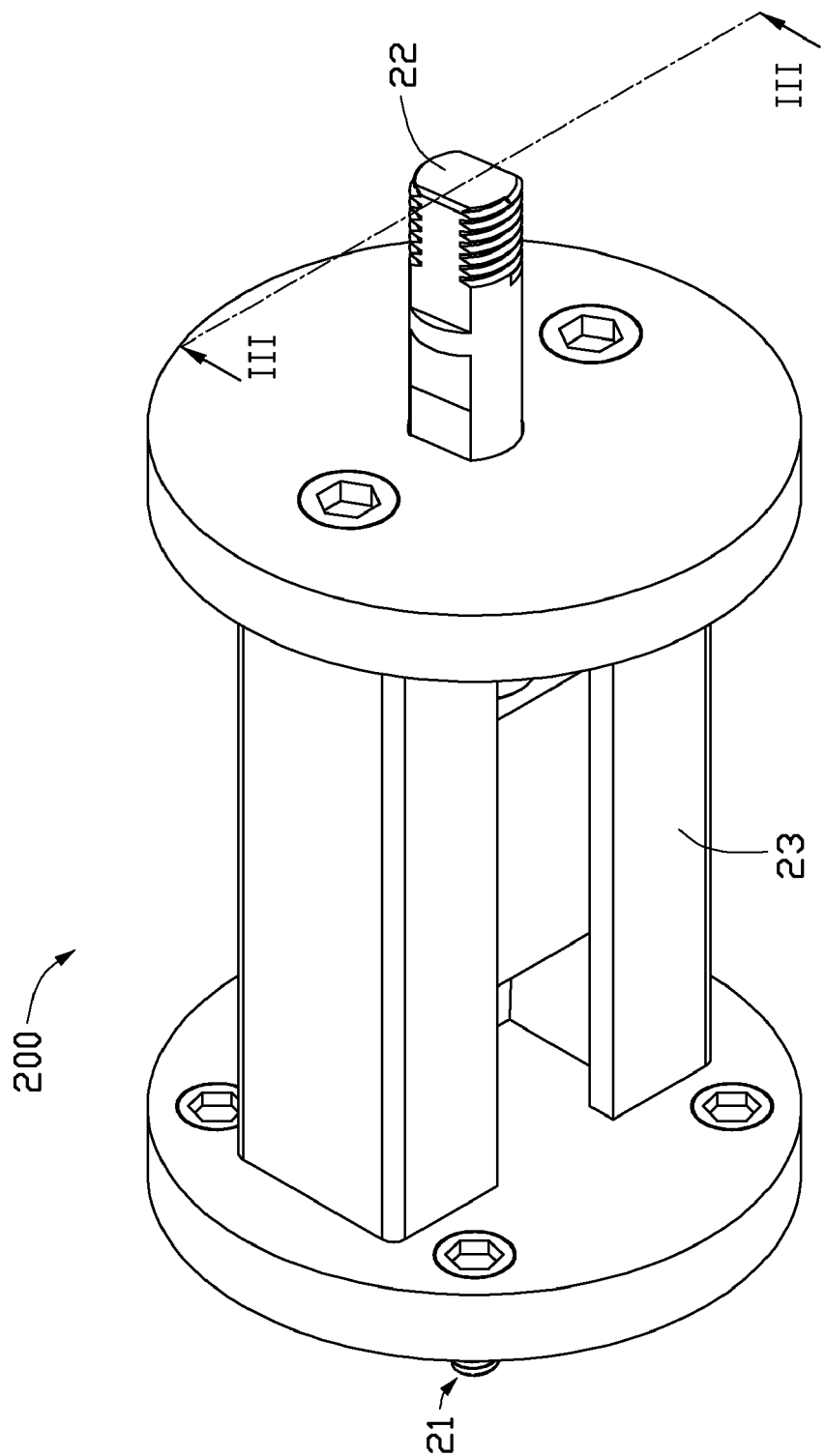
FIG. 1 is an assembled, isometric view of one embodiment of a shaft coupling device with one embodiment of an overload protection mechanism.

Referring to FIG. 1, one embodiment of a shaft coupling device 200 includes a first connecting portion 21, a second connecting portion 22, and an overload protection mechanism 23. The overload protection mechanism 23 interconnects the first and second connecting portions 21, 22. The shaft coupling device 200 is used in a manipulator to interconnect a mechanical arm and a mechanical hand of the manipulator. The first connecting portion 21 is operated to connect to a fixing shaft of the mechanical arm. The second connecting portion 22 is operated to connect with a rotary shaft of the mechanical hand. In the illustrated embodiment, the first connecting portion 21 includes a plurality of screws. The second connecting portion 22 is a spline shaft to connect with a rotary shaft (not shown) of the mechanical hand.

Figure 2:
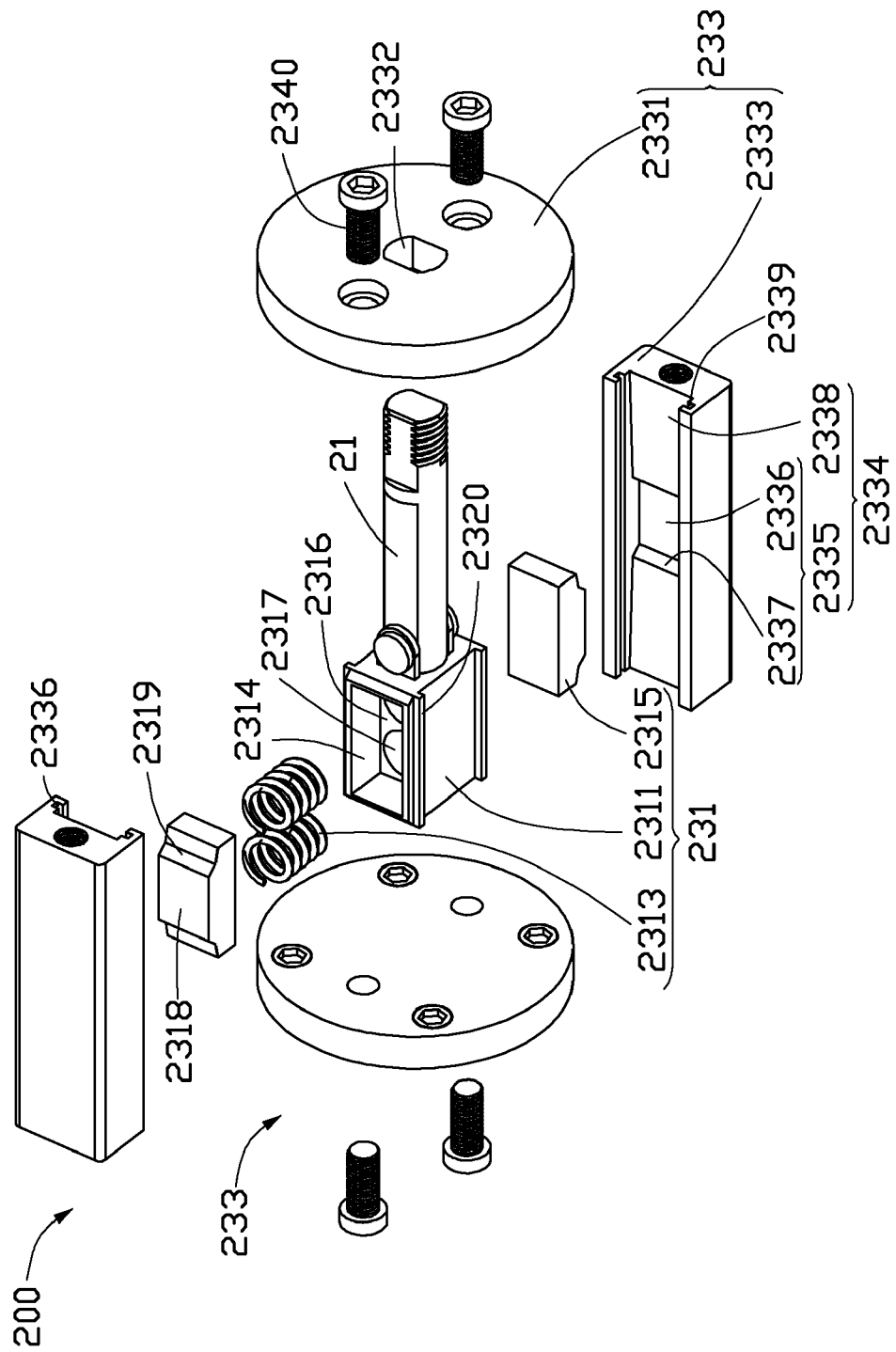
FIG. 2 is an exploded, isometric view of the shaft coupling device of FIG. 1.
Figure 3:
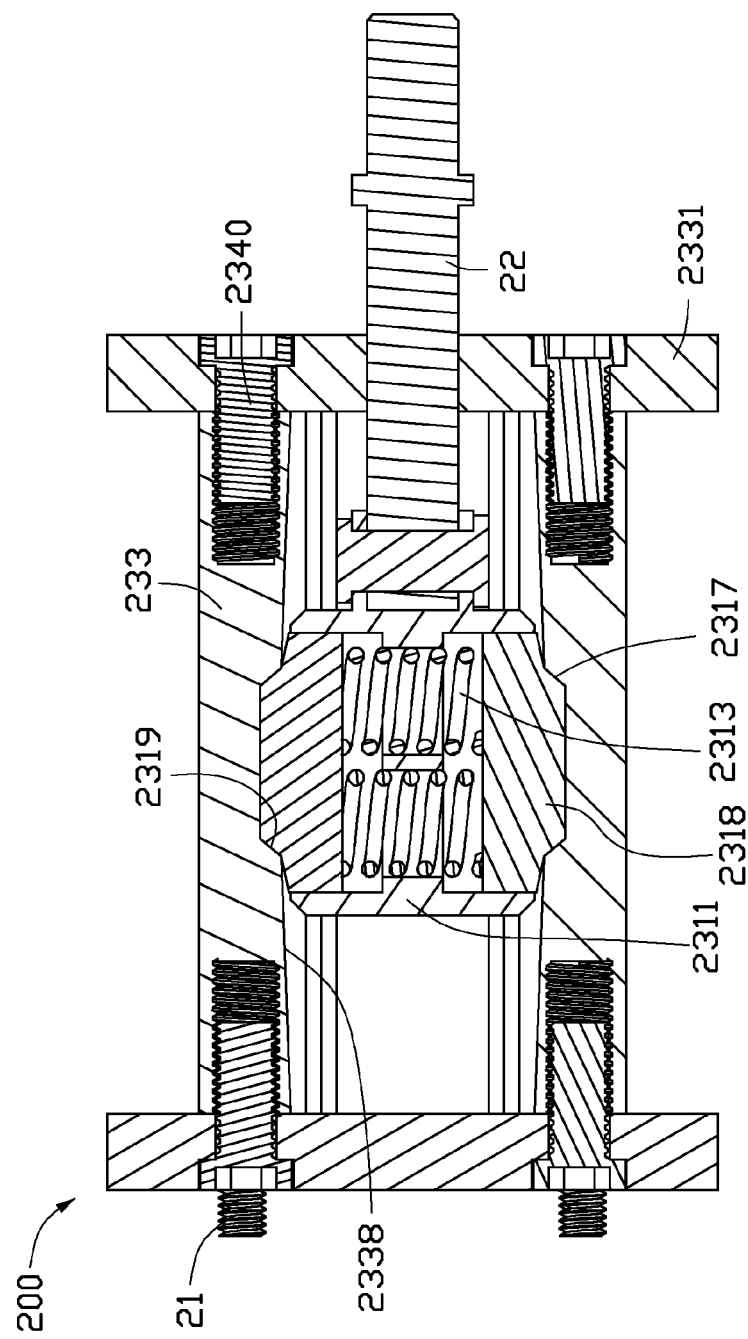
FIG. 3 is a side, cross-sectional view of the shaft coupling device of FIG. 1 taken along line III-III.

Referring to FIGS. 2 and 3, the overload protection mechanism 23 includes a frame 233 and a positioning assembly 231 positioned in the frame 233. The frame 233 includes two circular base plates 2331 and two side plates 2333. Each of the two base plates 2331 can be circular. Each of the two side plates 2333 can be substantially rectangular. The two side plates 2333 interconnect the two base plates 2331 by screws 2340. The two side plates 2333 face each other. The two side plates 2333 and the two base plates 2331 cooperatively define a receiving space to receive the positioning assembly 231.

The positioning assembly 231 includes a fixing sleeve 2311, two elastic members 2313 received in the fixing sleeve 2311, and two latching members 2315 positioned on a corresponding elastic member 2313. The fixing sleeve 2311 is a rectangular sleeve defining two openings 2314. The fixing sleeve 2311 further includes a positioning sheet 2316 disposed inside the fixing sleeve 2311. The positioning sheet 2316 defines two positioning holes 2317 spaced apart. Each of the two elastic members 2313 is a columnar spring received in the fixing sleeve 2311 passing through the corresponding positioning hole 2317. One of the base plate 2331 defines a through hole 2332. The second connecting portion 22 is fixed to a side surface of the fixing sleeve 2311, and passes through the through hole 2332 of the base plate 2331.

Each of the latching members 2315 is a plate, and is slidably attached to the corresponding opening 2314 of the fixing sleeve 2311. Each of the latching members includes a positioning protrusion 2318 extending out from a surface of each latching member 2315 away from the elastic member 2313. The positioning protrusion 2318 defines two slanted side surfaces 2319.

Each side plate 2333 of the frame 233 defines an elongated groove 2334 in a an inner surface of each side plate 2333 extending from one end of each side plate 2333 to the other end of each side plate 2333. Each side plate 2333 further defines a receiving depression 2335 in a bottom of the groove 2334 to receive the corresponding latching member 2315. The receiving depression 2335 includes a flat bottom surface and two slanted inner side surfaces 2337 corresponding to the two slanted side surfaces 2319 of the positioning protrusion 2318. Each side plate 2333 further includes two slanted repositioning surfaces 2338 in the groove 2334 adjoining the two slanted inner side surfaces 2337 of receiving depression 2335. A depth of the groove 2334 progressively decreases with increasing distance from the receiving depression 2335.

The fixing sleeve 2311 further includes two pairs of slide rails 2320. Each pair of slide rails 2320 extend out from the outer side of one end of the fixing sleeve 2311 adjacent to the corresponding openings 2314. Each side plate 2333 defines a pair of elongated slide grooves 2339 in opposite side surfaces of the groove 2334 corresponding to the pair of slide rails 2320. A length of the slide grooves 2339 is greater than that of the slide rails 2320.

The positioning assembly 231 is positioned between the two base plates 2331 and the two side plates 2333. The slide rails 2320 of the fixing sleeve 2311 are slidably attached to the corresponding slide groove 2339 of the side plates 2333. The elastic members 2313 are compressed, and two ends of each elastic member 2313 resist the two latching members 2315 to be received in the corresponding receiving depressions 2335. The slanted side surfaces 2319 resist the slanted inner side surfaces 2337, thereby the positioning assembly 231 is positioned in the receiving depressions 2335 to interconnect the first connecting portion 21 with the second connecting portion 22. The first connecting portion 21 drives the second connecting portion 22 to rotate by means of the overload protection mechanism 23. When an external drawing force is applied to the second connecting portion 22, the latching members 2315 move along the slanted inner side surface 2337 of the receiving depression 2335, and move into the fixing sleeve 2311 with the compressed elastic members 2313, such that the external drawing force may be absorbed. Thus, the positioning assembly 231 is slidably received between the two side plates 2333 to protect the manipulator from using the shaft coupling device 200.

Figure 4:
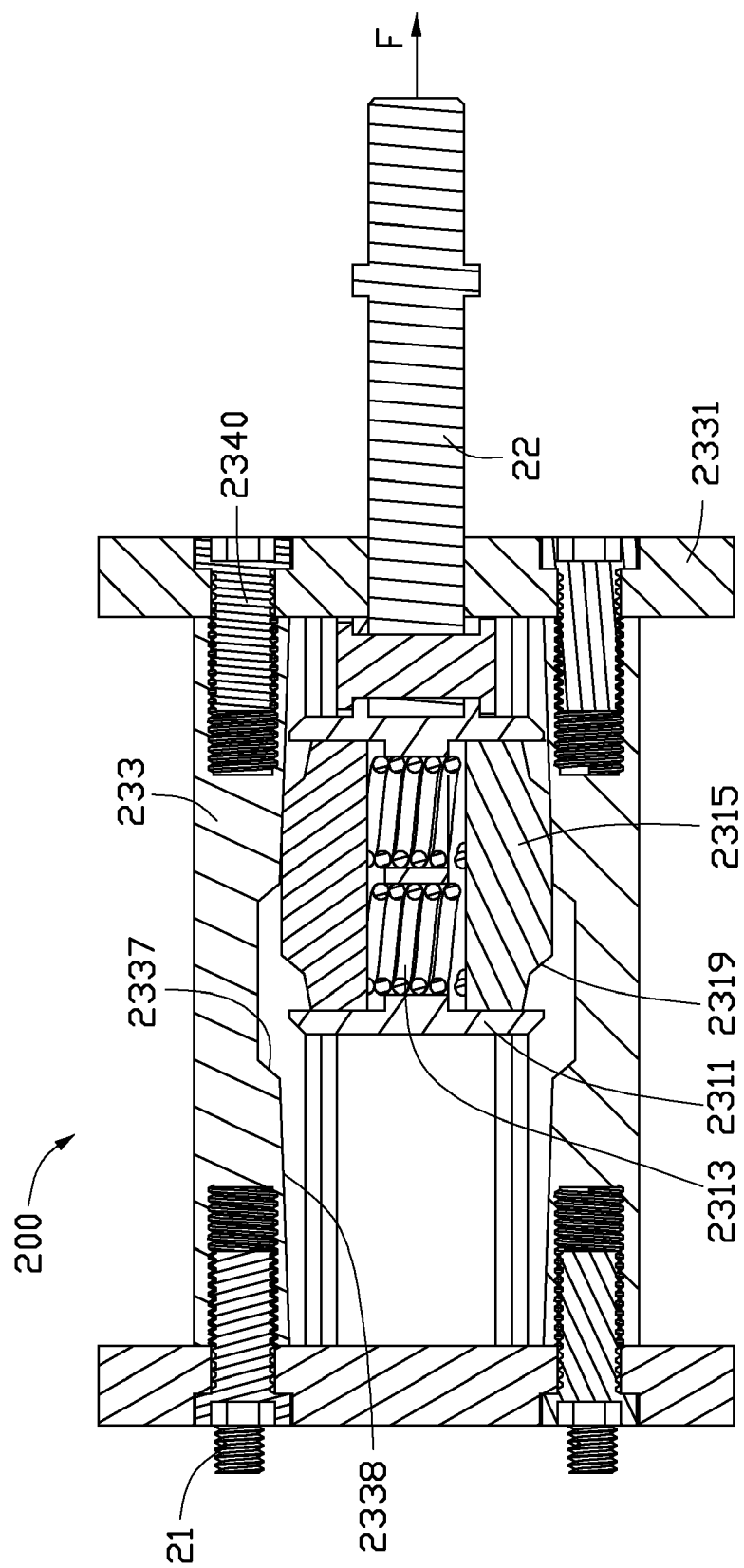
FIG. 4 is similar to FIG. 3, but showing another state of the shaft coupling device of FIG. 1.
Figure 5:
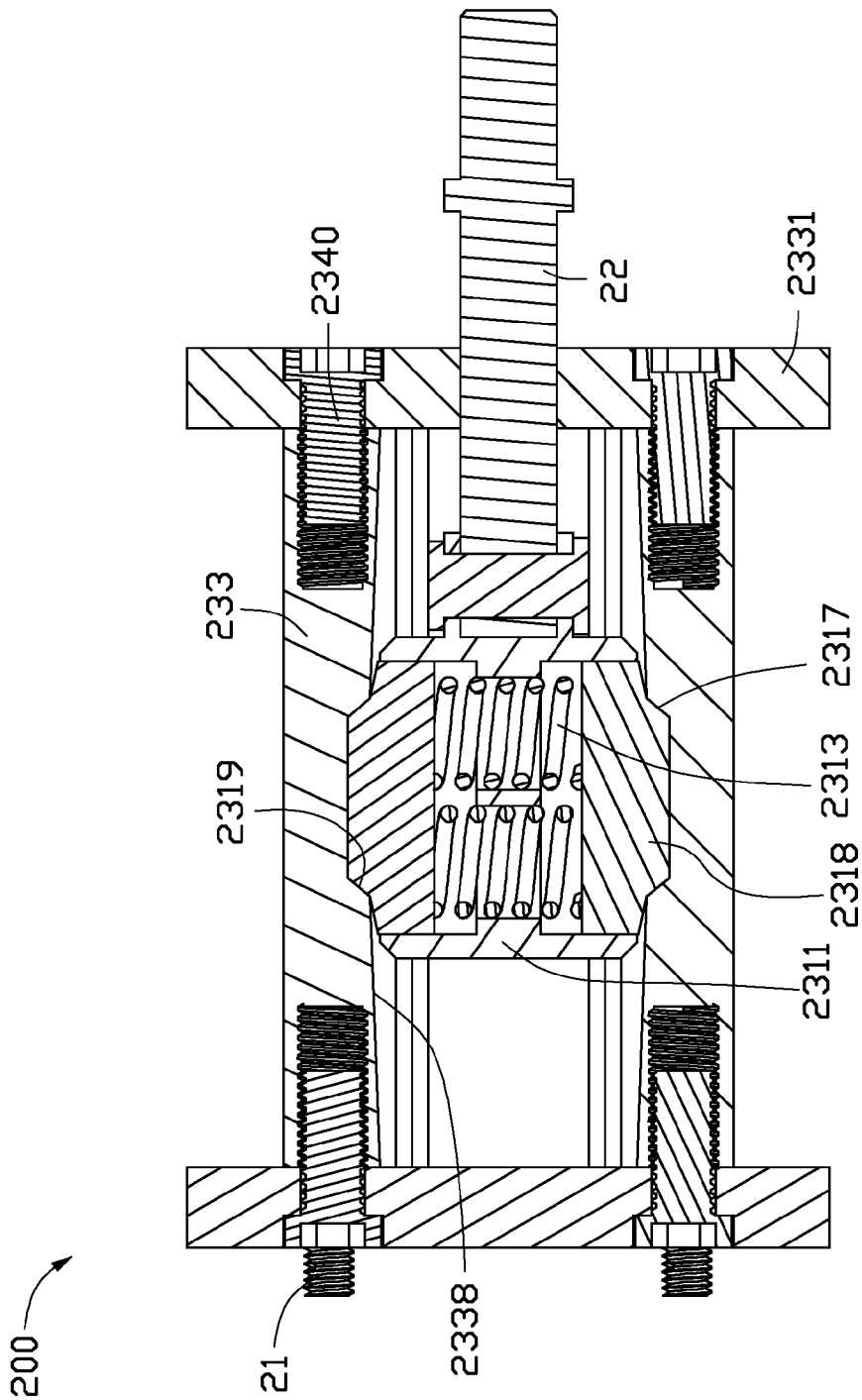
FIG. 5 is similar to FIG. 4, but showing a state of the shaft coupling device and the corresponding structure and configurations thereof when an overload drawing force is withdrawn from the shaft coupling device of FIG. 4.

Referring to FIG. 4, when an overload drawing force F is applied to the second connecting portion 22 along a direction parallel to an axis of the second connecting portion 22, the slanted side surfaces 2319 of the latching members 2315 move along the slanted inner side surface 2337 of the receiving depression 2335 with the elastic members 2313 being compressed by the latching members 2315, until the latching members 2315 resist and move along the slanted repositioning surfaces 2338 away from the receiving depression 2335, so as to absorb the overload drawing force F. Referring to FIG. 5, if the overload drawing force F is withdrawn, the latching members 2315 stop moving away from the receiving depression 2335. The elastic members 2313 pushes the latching members 2315 to press the slanted repositioning surfaces 2338. The friction between the latching members 2315 and the slanted repositioning surfaces 2338, may be overcome by a force which drives the latching members 2315 to move along the slanted repositioning surfaces 2338 toward the receiving depressions 2335, and thus the latching members 2315 slide back into the receiving depressions 2335 along the slanted repositioning surfaces 2338 automatically.

It is to be understood that the elastic members 2313 may be selected from one of resilient sheets, elastic blocks, and other springs.

It is should be noted that the configurations of the receiving depressions 2335 are not limited to the configurations described above. Each receiving depression 2335 can instead include any other suitable structure. For example, each receiving depression 2335 can include three, four, or more slanted inner side surfaces 2337.

It is noted that the scope of the overload protection mechanism 23 is not limited to the embodiment described above. The numbers and shapes of the elastic members 2313, the latching members 2315, and receiving depressions 2335 are specifically described and illustrated for the purpose of exemplifying various aspects of the present overload protection mechanism 23.

Finally, while the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure as defined by the appended claims.

What is claimed is:

1. An overload protection mechanism, comprising:
a frame comprising at least one side plate, the at least one side plate defining a receiving depression in an inner surface thereof;
a positioning assembly received in the frame, the positioning assembly comprising
a fixing sleeve,
at least one elastic member compressed and received in the fixing sleeve, and
at least one latching member positioned on the at least one elastic member, the at least one elastic member resisting the at least one latching member so as to be movably received in the receiving depression and the fixing sleeve, thereby the positioning assembly is received in the frame,
wherein the at least one side plate further defines a slanted repositioning surface adjoining the receiving depression; when an external drawing force is applied to the positioning assembly, the at least one latching member presses the at least one elastic member to leave the receiving depression and slide along the slanted repositioning surface, and thereby the external drawing force is absorbed; when the external drawing force is removed, the positioning assembly is slidable relative to the frame with the at least one compressed elastic member resisting the at least one latching member to press the at least one latching member back into the receiving depression along the slanted repositioning surface; the fixing sleeve further comprises at least one pair of slide rails extending out from the outer side of one end of the fixing sleeve adjacent to an opening of the fixing sleeve; the at least one side plate defines a pair of elongated slide grooves in opposite side surfaces of the groove corresponding to the pair of the slide rails; and the slide rails are slidably attached to the corresponding slide grooves of the at least one side plate.

2. The overload protection mechanism of claim 1, further comprising two base plates, wherein the at least one side plate comprises two side plates interconnected with the two base plates; the two side plates are opposite to each other; the two side plates and the two base plates cooperatively define a receiving space to receive the positioning assembly.

3. The overload protection mechanism of claim 2, wherein the at least one latching member is slidably attached to an opening of the fixing sleeve, the at least one latching member comprises a positioning protrusion extending out from a surface thereof away from the at least one elastic member.

4. The overload protection mechanism of claim 3, wherein the positioning protrusion of the at least one latching member defines two slanted side surfaces; the receiving depression comprises a flat bottom surface and two slanted inner side surfaces corresponding to the two slanted side surfaces of the positioning protrusion.

5. The overload protection mechanism of claim 1, wherein the at least one elastic member is selected from the group consisting of resilient sheet, elastic block, and spring.

6. The overload protection mechanism of claim 5, wherein the fixing sleeve further comprises a positioning sheet disposed inside thereof, the positioning sheet defines at least one positioning hole therein; the at least one elastic member is a spring, and is received in the fixing sleeve passing through the corresponding positioning hole.

7. A shaft coupling device, comprising:
a first connecting portion;
a second connecting portion; and
an overload protection mechanism interconnecting the first and second connecting portions, the overload protection mechanism comprising
a frame comprising at least one side plate, the at least one side plate defining a receiving depression in an inner surface thereof,
a positioning assembly received in the frame, the positioning assembly comprising
a fixing sleeve,
at least one elastic member compressed and received in the fixing sleeve, and at least one latching member positioned on the at least one elastic member, the at least one elastic member resisting the at least one latching member to be movably received in the receiving depression and the fixing sleeve, thereby the positioning assembly is received in the frame, wherein the at least one side plate further defines a slanted repositioning surface adjoining the receiving depression; when an external drawing force is applied to the positioning assembly, the at least one latching member presses the at least one elastic member to leave the receiving depression and slide along the slanted repositioning surface, and thereby the external drawing force is absorbed; when the external drawing force is removed, the positioning assembly is slidable relative to the frame with the at least one compressed elastic member resisting the at least one latching member to press the at least one latching member back into the receiving depression along the slanted repositioning surface; the fixing sleeve further comprises at least one pair of slide rails extending out from the outer side of one end of the fixing sleeve adjacent to an opening of the fixing sleeve; the at least one side plate defines a pair of elongated, slide grooves in opposite side surfaces of the groove corresponding to the pair of the slide rails; and the slide rails are slidably attached to the corresponding slide grooves of the at least one side plate.

8. The shaft coupling device of claim 7, further comprising two base plates, wherein the at least one side plate comprises two side plates interconnected with the two base plates; the two side plates are opposite to each other; the two side plates and the two base plates cooperatively define a receiving space to receive the positioning assembly.

9. The shaft coupling device of claim 8, wherein the at least one latching member is slidably attached to an opening of the fixing sleeve, the at least one latching member comprises a positioning protrusion extending out from a surface thereof away from the at least one elastic member.

10. The shaft coupling device of claim 9, wherein the positioning protrusion of the at least one latching member defines two slanted side surfaces; the receiving depression comprises a flat bottom surface and two slanted inner side surfaces corresponding to the two slanted side surfaces of the positioning protrusion.

11. The shaft coupling device of claim 8, wherein one of the base plate defines a through hole; the second connecting portion is fixed to a side surface of the fixing sleeve and passes through the through hole of the base plate.

12. The shaft coupling device of claim 7, wherein the at least one elastic member is selected from the group consisting of resilient sheet, elastic block, and spring.

13. The shaft coupling device of claim 12, wherein the fixing sleeve further comprises a positioning sheet disposed inside thereof, the positioning sheet defines at least one positioning hole therein; the at least one elastic member is a spring, and is received in the fixing sleeve passing through the corresponding positioning hole.

* * * * *